United States Patent Office 2,745,591
Patented May 15, 1956

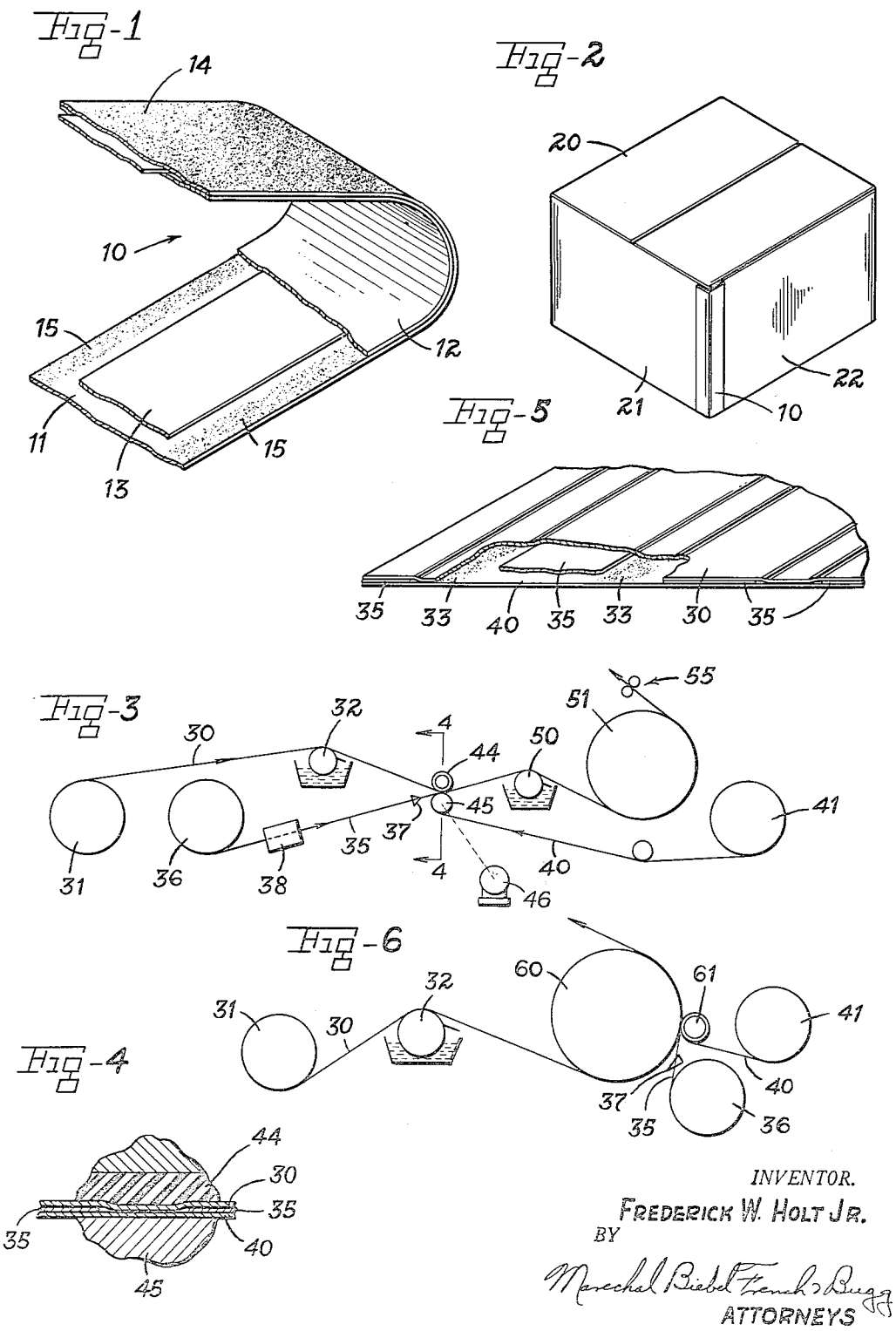
May 15, 1956     F. W. HOLT, JR     2,745,591
STAY TAPE
Filed Dec. 22, 1951
INVENTOR.
FREDERICK W. HOLT JR.
BY
ATTORNEYS

2,745,591

STAY TAPE

Frederick W. Holt, Jr., Troy, Ohio, assignor to The Brown-Bridge Mills Company, Inc., Troy, Ohio, a corporation of Ohio Application December 22, 1951, Serial No. 262,964

7 Claims. (Cl. 229—49)

This invention relates to reinforced sheet materials, and more particularly to reinforced paper products such as stay tape and the like.

One of the primary objects of the invention is to provide a reinforced stay tape which is simple and economical to manufacture, convenient to handle and apply, and strongly resistant to the stresses thereon in use.

In accordance with the invention, it has been discovered that highly satisfactory stay tape may be produced by combining multiple layers of paper or other sheet material in such manner as to provide one or more intermediate layers contained within but otherwise unsecured to the adjacent outer layers on either side thereof which are secured together along their edge portions to enclose the intermediate layer or layers. For example, one form of such stay tape may be produced by assembling a relatively narrow strip of web material between two somewhat wider strips which extend laterally beyond both sides of the narrower strip and are adhesively or otherwise secured together along these laterally extending edge portions, and in this composite tape the narrow strip may be of the same material as the wider strips or of different material, as for example in the case of a strip of fabric or foil enclosed within wider strips of paper.

It is therefore an object of the invention to provide a stay tape characterized by multiple layer form in which the outer layers are connected together along their side edges in such manner as to leave an unconnected area of substantial width between their central portions and thus to define a space or pocket which contains one or more intermediate layers entirely unconnected with the outer layers except for frictional engagement therebetween.

It is also an object of the invention to provide a multiple layer stay tape of the above characteristics adapted to be produced entirely from paper and without any additional material other than adhesive for securing the outer layers of the paper together and for applying the composite tape to a carton or other article on which it is intended to be used.

Other objects and advantages of the present invention will be apparent from the following description, the accompanying drawing and the appended claims.

In the drawing—

Fig. 1 is a fragmentary view in perspective showing a stay tape constructed in accordance with the invention;

Fig. 2 is a perspective view illustrating the tape of Fig. 1 applied as a stay tape on a carton;

Fig. 3 is a somewhat diagrammatic view illustrating apparatus and a method of fabricating the tape of Fig. 1;

Fig. 4 is an enlarged fragmentary section on the line 4—4 of Fig. 3;

Fig. 5 is a somewhat diagrammatic view showing the product of Fig. 4; and

Fig. 6 is a diagrammatic view illustrating another arrangement of apparatus for fabricating the tape of Fig. 1.

Referring to the drawing, which illustrates preferred embodiments of the invention, Fig. 1 shows a stay tape 10 which comprises essentially a bottom layer 11, a top layer 12 and an intermediate layer 13, and the bottom layer 11 is shown as having a gummed surface 14. The outer layers 11 and 12 are shown as of effectively the same width, but the intermediate layer 13 is of relatively less width so as to leave strips along both the side edges of the layers 11 and 12 which are in direct face to face relation, and these strips are shown as secured together by layers 15 of adhesive. As shown, the adhesive strips 15 are spaced beyond the edges of layer 13 so that this intermediate layer is entirely unconnected with layers 11 and 12 and is movable relative thereto. The relative dimensions of these parts are subject to variation as desired, depending upon the materials employed and the overall dimensions of the tape, but as an example of satisfactory dimensions for a stay tape formed of three layers of kraft paper with an overall width of two inches, the intermediate layer 13 may be 1¼ inches in width while each adhesive strip 15 may be of the order of ¼ inch in width, thus providing adequate clearance in the central space within the tape to receive the layer 13 freely therein.

Stay tape constructed as described in connection with Fig. 1 is shown in Fig. 2 in use along one corner of a corrugated carton 20 having side panels 21 and 22. The tape 10 is ordinarily fabricated in flat form for ready application to the box blank when the latter is in folded position such that the side panels 21 and 22 will be substantially coplanar and with their side edges in approximately abutting relation, and the tape may be secured in position either by means of the layer 14 of adhesive previously applied thereto or by a similar adhesive layer applied simultaneously with the taping operation on the carton. Thereafter when the box is set up and the panels 21 and 22 folded into perpendicular relation, the tape will similarly be caused to fold approximately along its center line as shown, giving a smooth and tight corner. This folding operation causes a definite lateral stretching of the top layer 12, as is readily demonstrated if the box is again thereafter folded flat, since a definite bulge will then be seen along the center of the tape, and also when the tape is folded around the box corner, the free central layer 13 can readily shift within the tape as required for optimum fitting and to relieve local strains and thus to equalize the strains across the entire width of the tape.

An especially desirable effect of this stretching is that the top layer 12 is caused to exert a strong frictional grip on the intermediate layer 13 against the inner layer 11, and it appears from test results that this frictional grip is effectively equivalent to a positive bond between the three layers from the standpoint of providing mutual reinforcement of each other. At the same time, with the adhesive limited to the strip portions 15 and the attaching layer 14, there is materially reduced tendency to shearing stresses such as would exist if each pair of adjacent layers were adhesively bonded together. This limited use of adhesive further promotes the utility of the tape by enhancing its flexibility, especially as contrasted with a multiple layer tape in which all the layers are adhered together, over either their entire widths or portions of their widths, as well as materially reducing the quantity of adhesive required and hence the production cost of the tape. Furthermore the increased flexibility of this tape is an important advantage for both machine and hand taping operations, since it promotes increased operating speeds and also makes practical the use of less expensive adhesives than are needed for stiffer tapes.

As noted, the stay tape of the invention is readily adaptable to fabrication with all of the layers formed of paper, and satisfactory results have been obtained with a variety of combinations of kraft paper layers of different weights. For example, the two outer layers may be of 60-pound kraft and the intermediate layer of 90, 60 or even 35-pound kraft, and similarly the weights of the outer layers may be varied depending upon the use to which the tape is to be put. Also the intermediate layer may be a composite layer formed of two or more webs of thin paper, and for some purposes materials other than plain paper may be used, such as reinforced paper fabric or plastic film. For some uses it may prove desirable to coat one or more of the layer surfaces within the tape with a latex or other coating tending to increase the frictional grip between the layers or otherwise to enhance the properties of the tape as, for example, if a waterproof coating is used.

Figs. 3–5 illustrate a convenient method and arrangement of apparatus for fabricating the stay tape of Fig. 1. A web 30 is shown as advancing from supply roll 31 over a strip gumming roll or series of such rolls 32 arranged to apply spaced parallel strips of adhesive 33 to the lower surface of web 30. For example, in the manufacture of 2-inch stay tape the strips 33 of adhesive may be ½ inch in width and spaced 1½ inches apart. A plurality of webs 35 advance in spaced parallel relation from a supply source 36 towards the strip gummed surface of web 30, each web 35 being of the proper narrow width to fit between adjacent adhesive strips 33 and being guided into properly aligned relation between the adhesive strips by guides indicated diagrammatically at 37. The supply source 36 may comprise a plurality of preslit rolls arranged in properly spaced relation, or if the source 36 is a single roll, a suitable unit for slitting and spacing the resulting separate webs 35 may be provided as indicated diagrammatically at 38.

The webs 30 and 35 are combined with a third web 40 from a supply roll 41 at the nip of pressure rolls 44 and 45, which are preferably driven as indicated diagrammatically by the motor 46, and the roll 44 is shown as rubber covered and the roll 45 as of steel for cooperative action to effect adhesion of web 40 to all of the adhesive strips 33. This arrangement has the advantage of maintaining layer 40 essentially smooth to receive a subsequent layer of adhesive corresponding to the layer 14 in Fig. 1, which is shown as applied thereto by passing over a gumming roll 50 and then around a heated drum 51 to accelerate drying of the resulting adhesive layer. If desired, this gumming operation may be carried out at a subsequent work station or even at the box machine. In either case, the laminated sheet is readily converted to stay tape by slitting along the center line of each adhesive strip 33 as indicated diagrammatically at 55, thus forming a plurality of sections of stay tape each of substantially the characteristics described in connection with Fig. 1.

It will be noted that Figs. 4 and 5 show the layer 40 as effectively smooth while the layer 30 is shown as somewhat curved to accommodate the webs 35. It will be apparent that this effect is exaggerated in the drawings, since in fact the differences in thickness between the webs 35 and the adhesive strips 33 will be only a few thousandths of an inch, and these differences will ordinarily be adequately compensated for by lateral stretching of the web 30 as it passes through the pressure rolls. If desired, however, allowance may be made for the necessarily slightly greater width of the layer 30 in the finished tape by initially employing a web 30 which is correspondingly slightly wider than web 40. Care should be taken, however, to avoid undue looseness or freedom of the webs 35 between the other two layers by maintaining the difference in width of the two other layers as small as possible in order to assure tight gripping of the intermediate web when the tape is in use on a box as described in connection with Fig. 2 while at the same time maintaining substantially the full original strength of the outer layer of the tape.

Fig. 5 illustrates another convenient method and arrangement of apparatus for fabricating the stay tape of Fig. 1, and in Fig. 6 the several webs and supply rolls correspond to the similarly numbered parts in Fig. 3. In place, however, of the pressure rolls 44 and 45, in this arrangement the three layers of web material meet at the nip of a heated drum 60 with a rubber covered pressure roll 61 which corresponds to the roll 44 and cooperates in a similar manner with drum 60 to effect adhesion of the web 40 to all of the adhesive strips on web 30 while maintaining web 30 effectively smooth. The laminated sheet advancing from the drum 60 may be gummed and slit as desired at subsequent work stations as described in connection with Fig. 3 with the gummed layer being preferably applied to the surface of the smooth web 30.

The methods illustrated in Figs. 3–6 are desirable and convenient for quantity production of the stay tape of the invention, although it will be apparent that the tape may be formed in single widths by essentially the same methods, and in fact this procedure is adapted to be integrated with box forming operations on a box machine. In each case, the method is simple and economical, and it is applicable to a wide range of both sheet and adhesive materials as well as to varied widths of tape.

While the method and article herein described constitute preferred embodiments of the invention, it is to be understood that the invention is not limited to this precise method and article, and that changes may be made therein without departing from the scope of the invention which is defined in the appended claims.

What is claimed is:

1. In a carton of the character described formed of a blank including a pair of panels adapted to be connected along adjacent edges to form a joint and to lie at substantially right angles to each other in the finished carton, means forming a reinforced connection between said panel edges comprising a pair of inner and outer layers of web material arranged in superimposed relation and extending lengthwise along said panel edges, adhesive securing said inner layer to said panels, means connecting both side edges of said layers together, said connecting means being confined to portions of said layers extending along the side edges thereof and spaced from each other laterally of said layers to leave a substantial portion of said layers along the centers thereof unconnected and defining a space therebetween, a separate layer of web material received within said space, said separate layer being not greater in width than said space and being unconnected with said pair of layers, and said outer layer being not substantially greater in width than said inner layer and being under sufficient lateral stress to effect frictional gripping of said separate layer between said inner and outer layers in the finished carton while maintaining substantially the full original strength of said outer layer.

2. In a carton of the character described formed of a blank including a pair of adjacent panels adapted to be connected along adjacent edges to form a joint and to lie at substantially right angles to each other in the finished carton, stay tape forming a reinforced connection between said panel edges comprising a pair of inner and outer layers of paper arranged in superimposed relation and extending lengthwise along said panel edges, means adhesively securing said inner layer to said panels, said layers being secured together along the side edges thereof by strips of adhesive material extending along said side edges and spaced from each other laterally of said layers to leave a substantial portion of said layers along the centers thereof unconnected and defining a space therebetween, a separate layer of web material received within said space and confined therewithin by said connected edges of said pair of layers, said separate layer being not greater in width than said space and being unconnected with said pair of layers, and said outer layer being not substantially greater in width than said inner layer and being under substantial lateral stress to effect frictional gripping of said separating layer between said inner and outer layers in the finished carton.

3. A stay tape comprising a pair of layers of web material arranged in superimposed relation and of substantially the same width, adhesive means forming strips extending between and connecting both opposed side edges of said layers, said strips being confined to said side edges in spaced relation laterally of said layers to leave a continuous substantial portion of said layers along the centers thereof unconnected and free to move relative to each other and to define a space therebetween, a separate layer of web material chosen from the class consisting of paper, fabric and plastic film and of substantially the same length as each of said pair of layers, said separate layer being of a width less than the spacing between said adhesive strips and being received and confined within said space by said connected edges of said pair of layers in entirely unconnected relation with either of said pair of layers, and a coating of adhesive material on the outer surface of one of said pair of layers for securing the resulting composite tape to an article to be sealed while leaving said separate layer free to move with respect to both of said pair of layers.

4. A stay tape comprising a pair of layers of fibrous web material arranged in superimposed relation and of substantially the same width, adhesive means forming strips extending between and connecting both opposed side edges of said layers, said strips being confined to said side edges in spaced relation laterally of said layers to leave a continuous substantial portion of said layers along the centers thereof unconnected and free to move relative to each other and to define a space therebetween, a separate layer of fibrous web material received within said space and of substantially the same length as each of said pair of layers, said separate layer being of a width less than the spacing between said adhesive strips and being confined within said space by said connected edges of said pair of layers in entirely unconnected relation with either of said pair of layers, and a coating of adhesive material on the outer surface of one of said pair of layers for securing the resulting composite tape to an article to be sealed while leaving said separate layer free to move with respect to both of said pair of layers.

5. A stay tape comprising a pair of layers of paper arranged in superimposed relation and of substantially the same width, adhesive means forming strips extending between and connecting both opposed side edges of said layers, said strips being confined to said side edges in spaced relation laterally of said layers to leave a continuous substantial portion of said layers along the centers thereof unconnected and free to move relative to each other and to define a space therebetween, a separate layer of web material chosen from the class consisting of paper, fabric and plastic film and of substantially the same length as each of said pair of layers, said separate layer being of a width less than the spacing between said adhesive strips and being received and confined within said space by said connected edges of said pair of layers in entirely unconnected relation with either of said pair of layers, and a coating of adhesive material on the outer surface of one of said pair of layers for securing the resulting composite tape to an article to be sealed while leaving said separate layer free to move with respect to both of said pair of layers.

6. A stay tape comprising a pair of layers of paper arranged in superimposed relation and of substantially the same width, adhesive means forming strips extending between and connecting both opposed side edges of said layers, said strips being confined to said side edges in spaced relation laterally of said layers to leave a continuous substantial portion of said layers along the centers thereof unconnected and free to move relative to each other and to define a space therebetween, a separate layer of fibrous web material of substantially the same length as each of said pair of layers received within said space, said separate layer being of a width less than the spacing between said adhesive strips and being confined within said space by said connected edges of said pair of layers in entirely unconnected relation with either of said pair of layers, and a coating of adhesive material on the outer surface of one of said pair of layers for securing the resulting composite tape to an article to be sealed while leaving said separate layer free to move with respect to both of said pair of layers.

7. A stay tape comprising a pair of layers of paper arranged in superimposed relation and of substantially the same width, adhesive means forming strips extending between and connecting both opposed side edges of said layers, said strips being confined to said side edges in spaced relation laterally of said layers to leave a continuous substantial portion of said layers along the centers thereof unconnected and free to move relative to each other and to define a space therebetween, a separate layer of paper of substantially the same length as each of said pair of layers received within said space, said separate layer being of a width less than the spacing between said adhesive strips and being confined within said space by said connected edges of said pair of layers in entirely unconnected relation with either of said pair of layers, and a coating of adhesive material on the outer surface of one of said pair of layers for securing the resulting composite tape to an article to be sealed while leaving said separate layer free to move with respect to both of said pair of layers.

References Cited in the file of this patent

UNITED STATES PATENTS

| Number | Name | Date |
|---|---|---|
| 303,735 | Jackson | Aug. 19, 1884 |
| 922,772 | Kaufman | May 25, 1909 |
| 1,987,246 | Rounds | Jan. 8, 1935 |
| 2,098,909 | Angier | Nov. 9, 1937 |
| 2,232,783 | Hausheer | Feb. 25, 1941 |
| 2,240,256 | Elmendorf | Apr. 29, 1941 |
| 2,511,303 | Stevens et al. | June 13, 1950 |
| 2,610,937 | Frink et al | Sept. 16, 1952 |
| 2,613,991 | Schindler | Oct. 14, 1952 |
| 2,651,588 | Bruce et al | Sept. 8, 1953 |